US011990806B2

(12) United States Patent
Latulipe et al.

(10) Patent No.: US 11,990,806 B2
(45) Date of Patent: May 21, 2024

(54) ELECTRIC MACHINE SYSTEMS

(71) Applicant: PRATT & WHITNEY CANADA CORP., Longueuil (CA)

(72) Inventors: Eric Latulipe, Ste-Julie (CA); Richard Freer, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 144 days.

(21) Appl. No.: 17/514,661

(22) Filed: Oct. 29, 2021

(65) Prior Publication Data

US 2022/0052592 A1 Feb. 17, 2022

Related U.S. Application Data

(62) Division of application No. 16/212,802, filed on Dec. 7, 2018, now Pat. No. 11,190,093.

(51) Int. Cl.
| | |
|---|---|
| *H02K 29/03* | (2006.01) |
| *F16H 1/22* | (2006.01) |
| *H02K 7/116* | (2006.01) |
| *H02K 16/02* | (2006.01) |

(52) U.S. Cl.
CPC ............. *H02K 29/03* (2013.01); *F16H 1/22* (2013.01); *H02K 7/116* (2013.01); *H02K 16/02* (2013.01)

(58) Field of Classification Search
CPC ........ H02K 29/03; H02K 7/116; H02K 16/02; H02K 51/00; F16H 1/22
USPC .......................................................... 310/83
See application file for complete search history.

(56) References Cited

U.S. PATENT DOCUMENTS

| | | | | |
|---|---|---|---|---|
| 1,292,592 | A | * | 1/1919 | Ferris ..................... H02K 16/00 310/112 |
| 1,720,208 | A | * | 7/1929 | Collins .................. H02K 23/52 310/90 |
| 1,785,965 | A | | 12/1930 | Major |
| 3,163,791 | A | | 12/1964 | Carlson |
| 3,683,249 | A | | 8/1972 | Shibata |
| 5,252,879 | A | | 10/1993 | Romberg et al. |
| 5,365,137 | A | | 11/1994 | Richardson et al. |
| 6,318,496 | B1 | * | 11/2001 | Koehler ............... B62D 5/0409 310/105 |
| 7,615,903 | B2 | | 11/2009 | Holmes et al. |
| 7,973,422 | B2 | | 7/2011 | Colin et al. |
| 8,138,652 | B2 | * | 3/2012 | Davis .................. H02P 25/0925 310/168 |

(Continued)

FOREIGN PATENT DOCUMENTS

DE 102015215859 A1 2/2017

OTHER PUBLICATIONS

European Patent Office, Communication dated May 11, 2020 re: application No. 19214606.6.

(Continued)

*Primary Examiner* — John K Kim

(74) *Attorney, Agent, or Firm* — Norton Rose Fulbright Canada LLP

(57) ABSTRACT

An electric machine system described herein comprises a first electric machine rotor, a first gear and a second gear. The first gear is connected to the first electric machine rotor and to a first input/output shaft. The second gear is connected to the first electric machine rotor and to a second input/output shaft. The first electric machine rotor is disposed between the first gear and the second gear.

8 Claims, 12 Drawing Sheets

(56) References Cited

U.S. PATENT DOCUMENTS

| | | | |
|---|---|---|---|
| 8,232,700 B2 | 7/2012 | Dooley | |
| 10,294,634 B2 | 5/2019 | Tigue et al. | |
| 10,998,806 B2* | 5/2021 | Latulipe | H02K 16/00 |
| 11,011,966 B2* | 5/2021 | Latulipe | F16H 1/22 |
| 11,190,093 B2* | 11/2021 | Latulipe | H02K 29/03 |
| 2010/0025128 A1 | 2/2010 | Abe et al. | |
| 2010/0156205 A1* | 6/2010 | Davis | H02K 19/06 |
| | | | 310/46 |
| 2012/0025747 A1* | 2/2012 | Foster | B60L 7/14 |
| | | | 318/495 |
| 2014/0028031 A1* | 1/2014 | Tsuchiya | B60K 6/448 |
| | | | 290/38 B |
| 2016/0097185 A1 | 4/2016 | Tigue et al. | |
| 2017/0001629 A1* | 1/2017 | Vyncke | B60K 6/543 |
| 2018/0319267 A1* | 11/2018 | Kaltenbach | B60K 6/547 |
| 2019/0077246 A1* | 3/2019 | Preuss | B60K 6/48 |
| 2019/0356187 A1* | 11/2019 | Fröhlich | H02K 1/185 |
| 2020/0186018 A1* | 6/2020 | Latulipe | H02K 16/02 |
| 2022/0052591 A1* | 2/2022 | Latulipe | H02K 29/03 |
| 2022/0052592 A1* | 2/2022 | Latulipe | H02K 16/02 |

OTHER PUBLICATIONS

English translation of German patent document No. DE102015215859 dated Feb. 23, 2017, https://patents.google.com/patent/DE102015215859A1/en?oq=DE102015215859, accessed on Jul. 7, 2020.

* cited by examiner

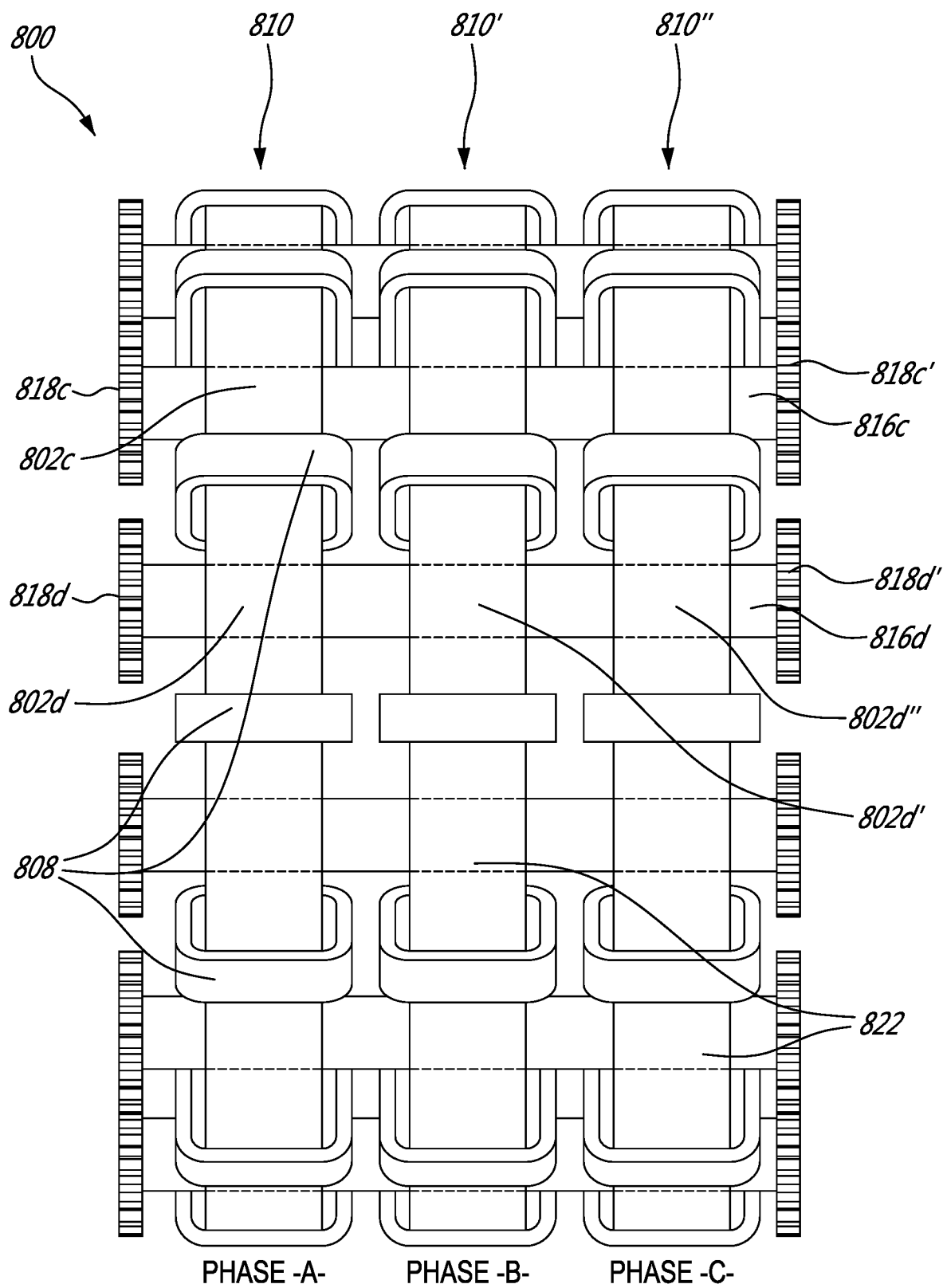
FIG_9

ELECTRIC MACHINE SYSTEMS

CROSS REFERENCE TO RELATED APPLICATION

This application is a divisional of U.S. patent application Ser. No. 16/212,802 filed on Dec. 7, 2018, the entire contents of which are hereby incorporated by reference.

FIELD

This relates generally to electric machines, and more particularly to multi-rotor electric machines such as motors and generators.

BACKGROUND

Electric machines with multiple rotors are known and may provide enhanced power over conventional electric machines. However, known multiple-rotor electric machines may provide unsteady output torque characteristics on individual rotors, and may require complex configurations. Moreover, multiple-rotor electric machines may have low durability due to variability in torque at the rotor level during operation. Improvement is desirable.

SUMMARY

In one aspect, the disclosure describes an electric machine system comprising:
  a first electric machine configured to drive a load, the first electric machine having a plurality of first rotors;
  a second electric machine having a plurality of second rotors, at least one of the second rotors indexed relative to a respective one of the first rotors to, in use, provide a torque phase offset between the first and second electric machines; and
  a shaft coupled to the load, the shaft connecting the respective one of the first rotors with the at least one of the second rotors, the respective one of the first rotors being coaxial with and axially spaced apart from the at least one of the second rotors.

The electric machine system may comprise a third electric machine having a plurality of third rotors, at least one of the third rotors indexed relative to the respective one of the first rotors and the at least one of the second rotors to, in use, provide a torque phase offset between the first and third electric machines and a torque phase offset between the second and third electric machines, wherein the at least one of the third rotors is connected to the shaft.

The torque phase offset between the first electric machine and the second electric machine may be 120 degrees.

The torque phase offset between the second electric machine and the third electric machine may be 120 degrees.

A respective one of the rotors in the pluralities of first, second and third rotors may be disposed at different axial positions relative to the shaft.

A respective one of the rotors in the pluralities of first, second and third rotors may be coaxial.

The shaft may be drivingly coupled to the load via one or more gears.

A respective one of the rotors in the pluralities of first and second rotors may be disposed at different axial positions relative to the shaft.

The electric machine system may comprise a plurality of shafts respectively interconnecting a respective one of the plurality of first rotors with a respective one of the plurality of second rotors.

Adjacent first rotors may be indexed to have a positional phase offset of 180 degrees with each other.

Adjacent second rotors may be indexed to have a positional phase offset of 180 degrees with each other.

The plurality of shafts may be drivingly coupled to the load via respective gears.

Each of the plurality of shafts may have parallel rotation axes.

The first rotors may be disposed to define a first circular array arrangement. The second rotors may be disposed to define a second circular array arrangement. The first circular array arrangement of first rotors may be coaxial with the second circular array arrangement of second rotors. The first circular array arrangement of first rotors may be axially offset from the second circular array arrangement of second rotors.

Embodiments can include combinations of the above features.

In another aspect, the disclosure describes an electric machine system comprising:
  a first electric machine configured to drive a load, the first electric machine having a plurality of first rotors driven using electric power having a first phase;
  a second electric machine configured to drive the load, the second electric machine having a plurality of second rotors driven using electric power having a second phase, the second phase different from the first phase; and
  one or more shafts, each shaft connecting a first rotor with a second rotor, the first rotor being coaxial with and axially spaced apart from the second rotor.

The electric machine system may comprise: a third electric machine having a plurality of third rotors driven using electric power having a third phase, the third phase different from the first phase and from the second phase, wherein each shaft connects one of the third rotors with the one of the second rotors and the one of the first rotors.

Each of the one more shafts may be drivingly coupled to the load by one or more gears.

The first rotors may be indexed to have a positional phase offset relative to each other.

The first phase and the second phase may be offset by 120 degrees.

The second electric machine may be axially offset from the first electric machine.

The first electric machine may have a first common stator and one or more first windings circumferentially spaced apart on the first common stator. The second electric machine may have a second common stator and one or more second windings circumferentially spaced apart on the second common stator. The one or more second windings may be circumferentially offset from the one or more first windings.

The one or more shafts may be drivingly coupled to the load via respective gears.

The one or more shafts may have parallel rotation axes.

The first rotors may be disposed to define a first circular array arrangement. The second rotors may be disposed to define a second circular array arrangement. The first circular array arrangement of first rotors may be coaxial with the second circular array arrangement of second rotors. The first circular array arrangement of first rotors may be axially offset from the second circular array arrangement of second rotors.

Embodiments can include combinations of the above features.

In another aspect, the disclosure describes an electric machine system comprising:
- a first electric machine rotor;
- a first gear connected to the first electric machine rotor and to a first input/output shaft; and
- a second gear connected to the first electric machine rotor and to a second input/output shaft, the first electric machine rotor disposed between the first gear and the second gear.

A radius or number of teeth of the first gear may be different from a radius or number of teeth of the second gear.

Each of the one or more shafts may include a second electric machine rotor disposed between the first gear and the second gear.

Each of the one or more shafts may include at least a third electric machine rotor disposed between the first gear and the second gear.

The electric machine rotors of each of the one or more shafts may be indexed to have a positional phase offset relative to each other.

The electric machine rotors of each of the one or more shafts may be indexed to provide a torque phase offset relative to each other when operating in a motoring mode.

The electric machine rotors may be operable in a generating mode and in a motoring mode.

The one or more shafts may have parallel rotation axes.

The one or more shafts may be disposed to define a circular array arrangement.

Embodiments can include combinations of the above features.

In another aspect, the disclosure describes a power transmission system comprising:
- an input shaft;
- an output shaft;
- one or more electric machine rotors;
- a first gear connected to the input shaft; and
- a second gear connected to the output shaft, the one or more electric machine rotors being disposed between the first gear and the second gear.

A radius or number of teeth of the first gear may be different from a radius or number of teeth of the second gear.

Each of the one or more rotor shafts may include a second electric machine rotor disposed between the first gear and the second gear.

Each of the one or more rotor shafts may include at least a third electric machine rotor disposed between the first gear and the second gear.

The electric machine rotors of each of the one or more rotor shafts may be indexed to have a positional phase offset relative to each other.

The electric machine rotors of each of the one or more rotor shafts may be indexed to provide a torque phase offset relative to each other when operating in a motoring mode.

The electric machine rotors may be operable in a generating mode and in a motoring mode.

The one or more rotor shafts may have parallel rotation axes.

The one or more rotor shafts may include a plurality of rotor shafts disposed to define a circular array arrangement.

Embodiments can include combinations of the above features.

Other features will become apparent from the drawings in conjunction with the following description.

BRIEF DESCRIPTION OF DRAWINGS

In the figures which illustrate example embodiments,

FIG. 9 is a side view of an electric machine system having multiple electric machines with multiple rotors in parallel;

DETAILED DESCRIPTION

The disclosure provides electric machines, and in particular improved multiple-rotor electric machines such as motors and generators. In some embodiments, the machines described herein can provide improved operational characteristics and durability. In various aspects, for example, the disclosure provides electric motors and generators having a plurality of magnetized rotors, which may include or be in the form of single bi-pole magnets (i.e., two-pole rotors). The rotors are configured to drive and/or be driven by a common shaft, for example by suitable combinations and configurations of gears.

In some embodiments, the rotors are magnetically indexed, in pairs, with respect to each other and to corresponding electrical windings such that, when a current is passed through the one or more windings, the rotors provide phased rotary power to the common shaft. Alternatively, when torque is applied to the common shaft or gears connected thereto, a phased electrical output may be provided to the windings.

In some embodiments, the rotors are magnetically indexed along different planes perpendicular to the axial direction of the common shaft, and connected by common rotor shafts. That is, all of the rotors in a first plane may share a common phase, and all of the rotors in a second plane may share a common phase which is offset from the phase of the first plane. In some embodiments, there may be 3 planes each offset by 120 degrees. Any suitable number of planes may be used with suitable offsets.

Various aspects of preferred embodiments of electric machines according to the disclosure are described herein with reference to the drawings.

Electric machines may have more than one rotor. An example of a multi-rotor electric machine is provided in U.S. Pat. No. 8,232,700 B2, the contents of which are hereby incorporated by reference in their entirety.

Figure 1:
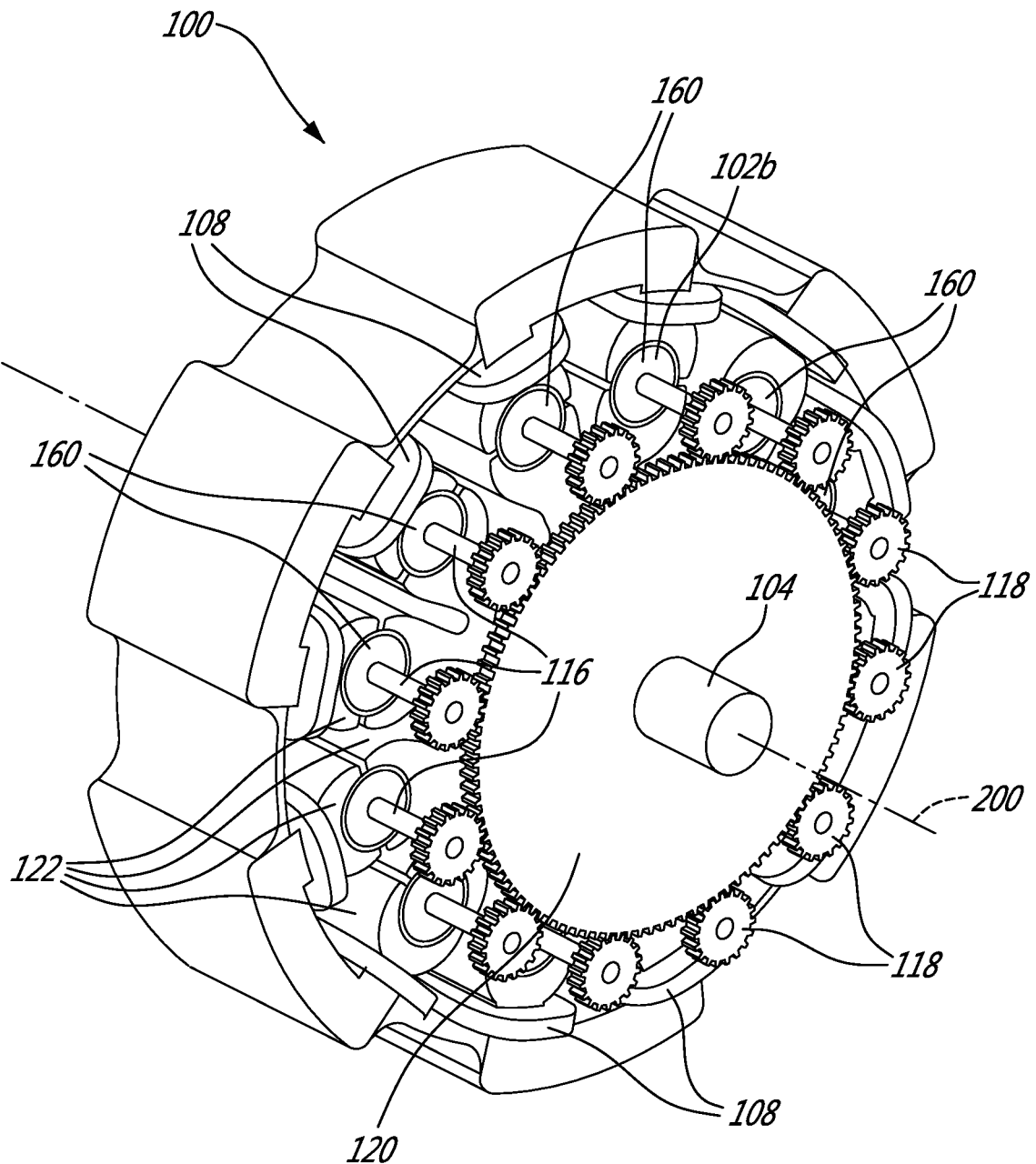
FIG. 1 is a schematic perspective view of portions of an example embodiment of an electric machine having multiple rotors.

FIG. 1 is a schematic perspective view of portions of an embodiment of an electric machine 100 having multiple rotors (also referred to herein as a "multi-rotor electric machine"). As illustrated, machine 100 comprises magnetic rotors 102, windings 108, stators 122, and shaft 104. In the embodiment shown, machine 100 comprises a plurality of magnetic rotors 102, each configured to rotate about an independent rotor shaft 116. Each rotor shaft 116 is configured to, under the impetus of magnetic rotors 102, drive shaft 104 via gears 118 and central gear 120 when machine 100 is operated as a motor and an electric current is applied to windings 108. Alternatively, magnetic rotors 102 are configured to rotate, and thus cause the flow of electric current in windings 108, when a torque is applied to shaft 104, such that machine 100 acts as a generator. It should be appreciated that gears 118 are shown without teeth in FIGS. 2 and 3 for the sake of clarity. Gears 118 may be provided in any suitable form, including, for example, toothless wheels engaged by friction.

In the embodiment shown, each rotor shaft is supported by front and back plates with suitable bearings (not shown), and is formed integral with or otherwise connected to a drive gear 118, which is configured to engage a central gear 120. In some embodiments, central gear 120 is formed integral with or otherwise connected to shaft 104, such that rotation of one or more rotors 102 causes drive gears 118 to drive central gear 120, and therefore shaft 104, into rotation.

In some embodiments, rotors 102 are configured to operate in electromagnetically independent pairs. That is, rotors 102a, 102b can be grouped magnetically into independent pairs 160, such that there is no provision of magnetic material linking any two pairs 160a, 160b of rotors together, and the links between separate rotor pairs 160 are the gears 118 or other mechanical couplings between them, and possibly a shared electric phase. The rotors 102a, 102b in a given pair 160 can benefit from the provision of common magnetic circuit components, such as stators 122 and/or windings 108. Such a configuration can reduce the amount of magnetic material required for operation of the rotors, with corresponding cost and weight savings.

Figure 3:
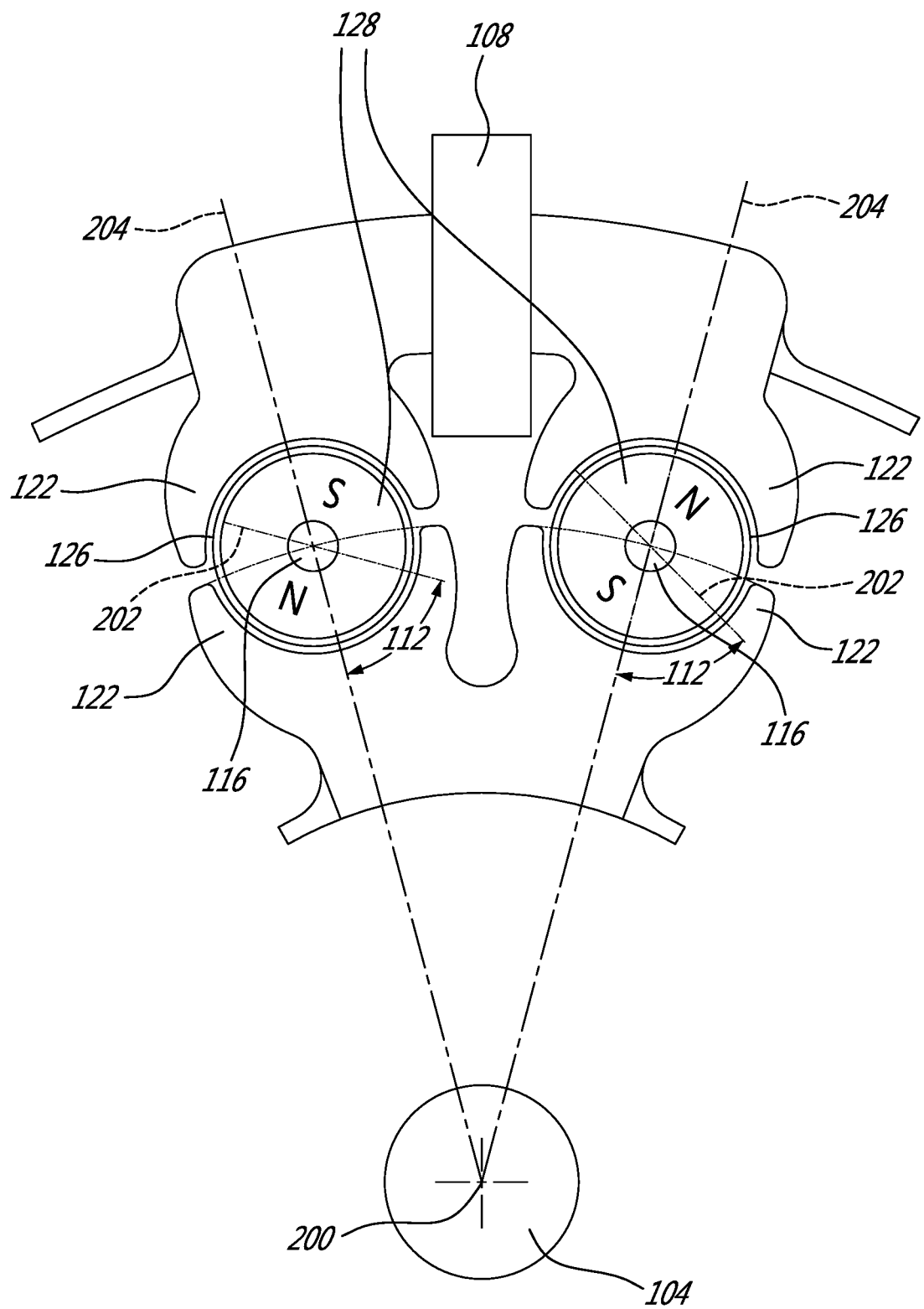
FIG. 3 is a schematic partial cut-away view of a portion of the electric machine of FIG. 1.

In the embodiment shown in FIG. 3, each rotor 102 comprises one or more magnets mounted on a rotor shaft 116 and retained, particularly when rotating, by containment sheath 126. Magnets 128 comprise north and south poles (denoted "N" and "S" respectively in the figures). In some embodiments, rotors 102 are bi-pole rotors. In some embodiments, rotors 102a, 102b in a given pair are indexed such that magnets 128 are mounted, and rotate, (a) as individual rotors 102, in a desired phase with respect to their pair mates 102a, 102b, and (b) by pairs 160, in a desired paired phase with respect to other pairs 160 and winding(s) 108. Advantages associated with this configuration are explained in U.S. Pat. No. 8,232,700, the contents of which are incorporated by reference.

Windings 108 may be provided in any configuration suitable for use in accomplishing the purposes described herein. For example, single Litz wire or multiple strand windings 108 may be used in configuring either machine 100, individual rotors 102, rotors pairs 160, or other desired sets of rotors 102. The use of multiple windings 108 in a machine 100 can be used, as for example in conjunction with suitable mechanical indexing of the rotors 102 to fully or partially provide desired phasings in torque applied by rotors 102 to shaft or load 104. For example, 3-phase windings used in known electric machines may be formed by appropriate interconnections of the separate windings in machines 100 according to the present disclosure.

As depicted, each rotor-driven gear 118 engages the periphery of central gear 120 such that total torque applied to central gear 120 is the sum of the torques applied by the gears 118. If winding(s) 108 are configured substantially circumferentially about axis 200 of shaft 104 and therefore machine 100, an index angle 112 may be defined between equators (that is, the line dividing magnet 128 into north and south halves) 202 of individual magnets 128 and radii 204 extending from axis 200 to the corresponding rotor 102. By suitable arrangement of rotors 102 and/or gears 118, index angles 112 may be set at desired values for individual rotors, and sets thereof, with the result that phased torque output applied by each of the rotor pairs 160 can be applied to provide smooth, continuous torque to shaft 104, when operated as a motor. When operated as a generator, smooth and continuous current may be output from overall winding(s) 108.

FIG. 1 depicts an embodiment having 12 rotors 102 (or 6 pairs 160) and 6 phases. As will be understood, embodiments described herein can be adapted to 6-rotor, 3-phase systems, 24-rotor, 12-phase systems, and other combinations.

In some embodiments, each rotor 102a in a given pair 160a may be phased magnetically at 180 degrees with respect to its pair mate 102b. Further, each of the 6 pairs 160a, 160b, 160c, 160d, 160e, 160f may be phased at 60 degrees relative to adjacent pairs. It should be appreciated that in FIG. 2, for simplicity, reference numerals 160a-f refer only to respective pairs of rotors 102a, 102b.

Likewise, in a 6-rotor, 3-phase system, each adjacent rotor pair 160a, 160b, 160c can be indexed by 120 degrees with respect to adjacent pairs. The same logic may be applied to configurations with more or fewer rotors.

However, in spite of providing smooth and continuous torque to central gear 120 as an overall system, each gear 118 in machine 100 suffers from a relatively high torque ripple (i.e., torques variations of a higher amplitude) during operation. That is, owing the nature of the operation of AC machines, the torque delivered by each rotor 102 varies from 0 to the maximum output torque twice per cycle. The impact of this torque ripple may be substantial in terms of the working life for a gear, as the gears are subjected to a wide variation of stress. The machine 100 may require low-backlash gears and/or high strength gears, which are expensive and may nevertheless be subjected to fretting damage over the course of operation.

Figure 4:
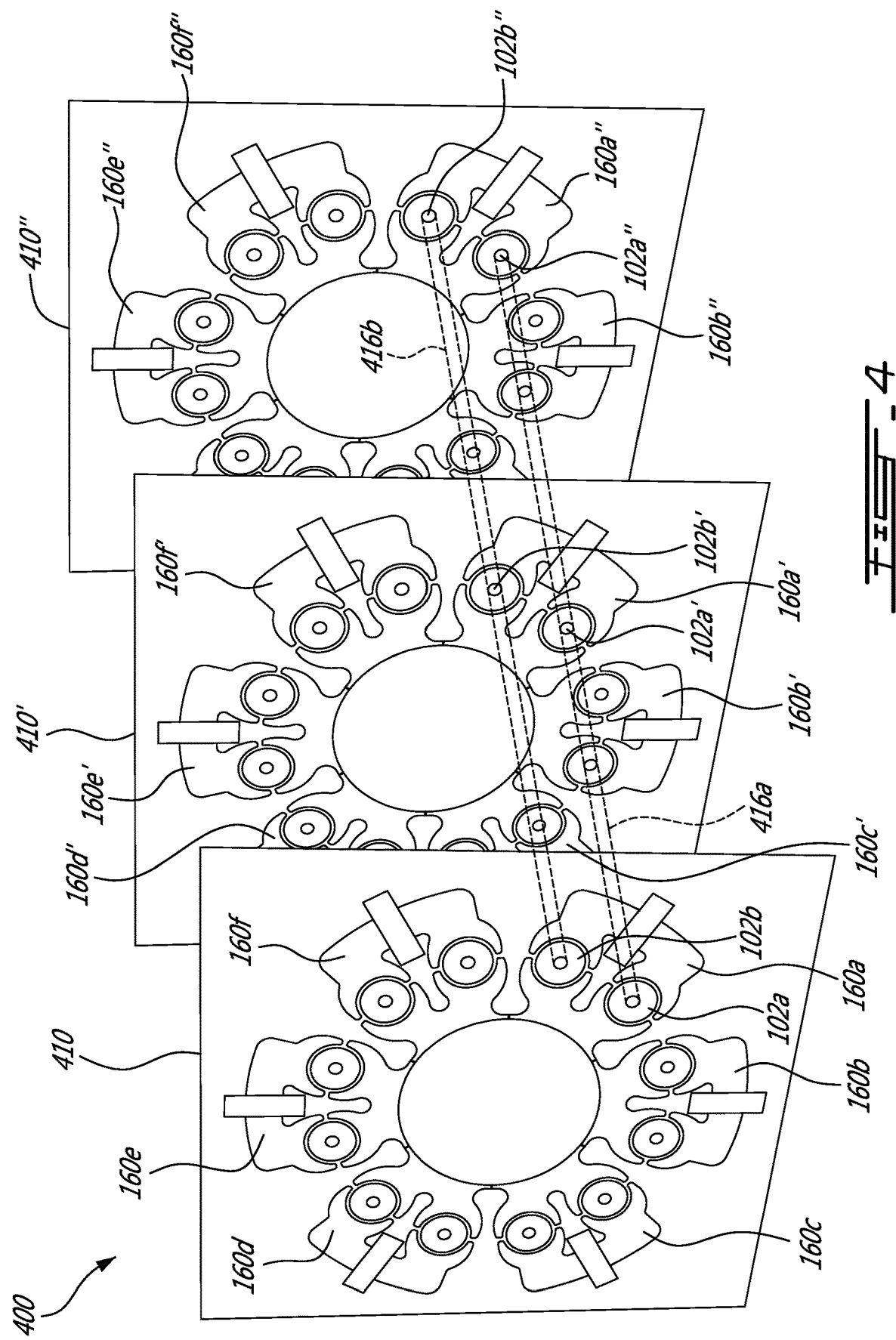
FIG. 4 is a simplified schematic perspective view of portions of an example embodiment of an electric machine with multiple rotors on a common shaft.

FIG. 4 is a simplified schematic perspective view of portions of an example embodiment of an electric machine system 400 having multiple rotors on a common shaft. As depicted, machine system 400 includes a plurality of multi-rotor machines 410, 410', 410" located in different planes along the axial direction of shaft 104. In some embodiments, as with machine 100, the rotors depicted in FIG. 4 are magnetically indexed in pairs 160 of rotors 102a, 102b which share a common stator 122. In some embodiments, rotors 102a and 102b may be offset by 180 degrees. As depicted, in each machine in system 400, each rotor pair 160a, 160b, 160c, 160d, 160e, 160f may have a phase offset of 60 degrees relative to adjacent rotor pairs of the same machine. As depicted, the rotors 102 of machine 410 are disposed to define a circular array arrangement about axis 200, and the rotors 102' of machine 410' are disposed to define a circular array arrangement about axis 200 which is axially offset from the circular array arrangement of machine 410. In some embodiments, the circular array arrangement of machine 410 may be coaxial with the circular array arrangement of machine 410'.

In an example embodiment using 3-phase power, in first machine 410, windings for rotor pairs 160a, 160d may be supplied with current from a first phase (denoted as phase C). Windings for rotor pairs 160b, 160e may be supplied with current from a second phase (denoted as phase A). Windings for rotor pairs 160c, 160f may be supplied with current from a third phase (denoted as phase B).

In the example embodiment of FIG. 4, windings for each pair 160a', 160b', 160c', 160d', 160e', 160f' of rotors 102a', 102b' in second machine 410' are similarly supplied by one of 3 phases (phase A, phase B, or phase C). Relative to axis 200, the current for the windings in second machine 410' are phase shifted by 120 degrees. As such, windings for pairs 160a' and 160d' are supplied by phase A, windings for pairs 160b' and 160e' are supplied by phase B, and windings for pairs 160c' and 160f' are supplied by phase C.

Similarly, the current for the windings in third machine 410" is phase shifted by 240 degrees relative to first machine 410. As such, windings for pairs 160a", 160d" are supplied by B, windings for pairs 160b", 160e" are supplied by phase C, and windings for pairs 160c", 160f" are supplied by phase A.

As depicted, machine 400 includes one or more extended rotor shafts 416a which interconnect a given rotor 102a in first machine 410 to a corresponding rotor 102a' in second machine 410' and a corresponding rotor 102a" in third machine 410". In some embodiments, shaft 416a interconnects a first rotor 102a and a second rotor 102a' without interconnecting a third rotor 102a". As depicted, the rotors 102a, 102a', 102a" are disposed at different axial positions relative to axis 200 of shaft 104. In some embodiments, rotors 102a, 102a', 102a" are coaxial.

Figure 5:
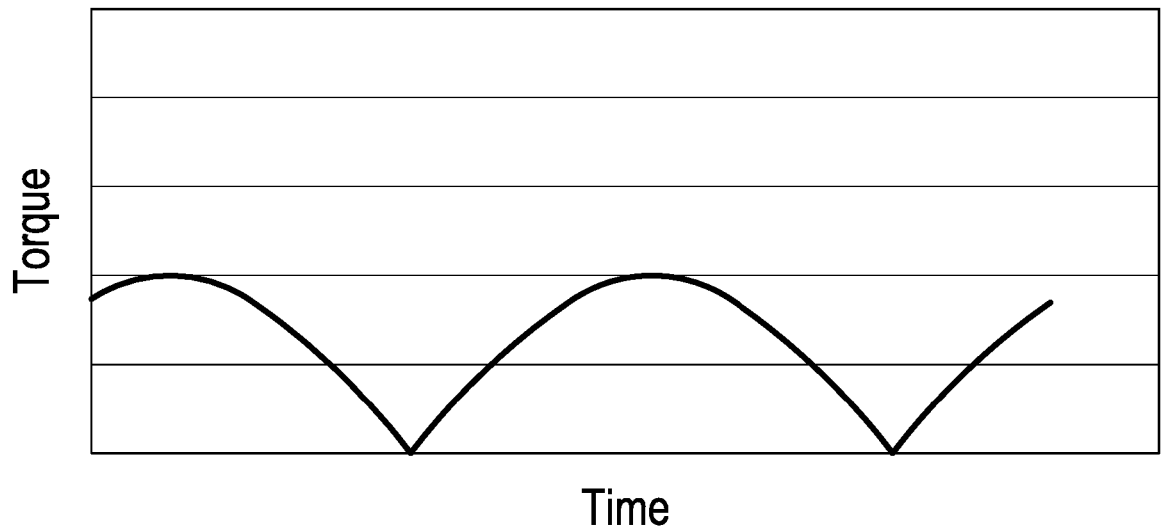
FIG. 5 is a diagram depicting the torque delivered by a rotor shaft of an electric multi-rotor machine.
Figure 6:
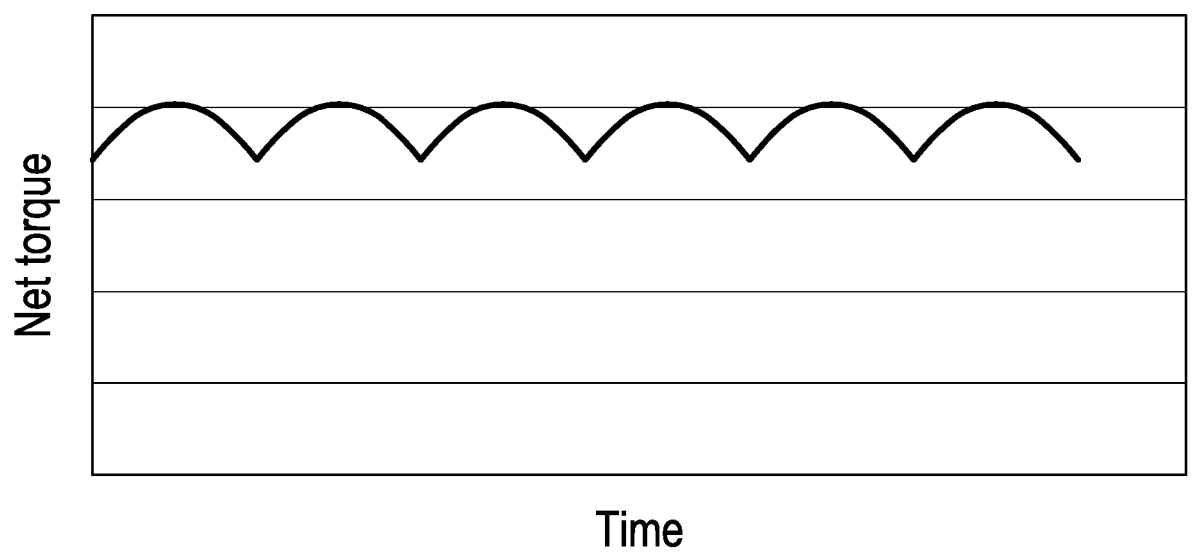
FIG. 6 is a diagram depicting the torque delivered by a rotor shaft of an electric machine with multiple rotors on a common shaft.

The total net torque delivered by rotor shaft 416a may be the sum of the torque provided by rotors 102a, 102a', 102a". Moreover, it will be appreciated that each of rotors 102a, 102a', 102a" is coupled to one of phase A, phase B, and phase C, respectively. As such, the resulting net torque provided to shaft 416a would be the sum of torques provided by rotors which are coupled to phases A, B and C, which are each offset by 120 degrees relative to the other phases. As such, the ripple in torque delivered by rotor shaft 416a may be substantially reduced. FIG. 5 is a diagram depicting the torque delivered by a rotor shaft 116 of machine 100. FIG. 6 is a diagram depicting the torque delivered by rotor shaft 416a of machine system 400. As will be appreciated, the torque delivered by rotor shaft 416a exhibits substantially less torque ripple (i.e., torques variations of a lower amplitude) than machine 100.

Rotor shaft 416b rotatably connects rotor 102b in first machine 410 to rotor 102b' in second machine 410' and to rotor 102b" in third machine 410" to define collective rotor 450b. Again, rotor shaft 416b is provided with torque from 3 rotors which are coupled to three separate phases A, B and C. As such, the torque delivered by collective rotor 450b exhibits substantially less torque ripple than machine 100. In some embodiments, rotors 102a, 102b in machine 410 are mechanically 180 degrees out of phase, rotors 102a', 102b' in machine 410' are mechanically 180 degrees out of phase, and rotors 102a", 102b" in machine 410" are mechanically 180 degrees out of phase with one another. This may further enhance the efficiency of machine system 400.

It should be appreciated that for simplicity, only two extended rotor shafts 416a, 416b are illustrated in FIG. 4. In some embodiments there may be a corresponding extended rotor shaft 416 for each rotor in first machine 410, provided there is a corresponding rotor in at least a second machine 410' to which the extended rotor shaft 416 can be connected. In some embodiments, the number of extended rotor shafts 416 may be less than the number of rotors in a given plane. In some embodiments, the extended rotor shafts 416 may have parallel rotational axes.

Although FIG. 4 depicts an electric machine system 400 with 3 parallel machines 410, 410', 410", it will be appreciated that embodiments with more than 3 or fewer than 3 parallel machines 410 are also contemplated. Similar configurations can be implemented using the appropriate phase differences between magnetic cores in different planes. In embodiments with two machines 410, 410', the first rotor 102a, second rotor 102a' and shaft 416a are coupled for common rotation.

In some embodiments, each rotor shaft 416 has a gear 118 affixed or connected thereto. As depicted, gear 118 is affixed or otherwise attached to rotor shaft 416 such that rotation of rotor shaft 416 causes gear 118 to rotate along the same rotational axis as the rotor shaft 416. Gear 118 is configured to engage with central gear 120 to drive a load. Given that the torque ripple is substantially reduced for each gear 118 owing to the rotor shaft 416 shared across machines 410, 410', 410", it will be appreciated that some embodiments disclosed herein may reduce the amplitude of the cyclic stress experienced by gears 118 while engaging with central gear 120. This may in turn increase the working life of gears, and may allow for the use of less expensive materials for gears 118. The reduction in the likelihood that gears 118 will suffer damage during operation may further increase the reliability and dependability of machine 400 relative to known electric machines.

Figure 2:
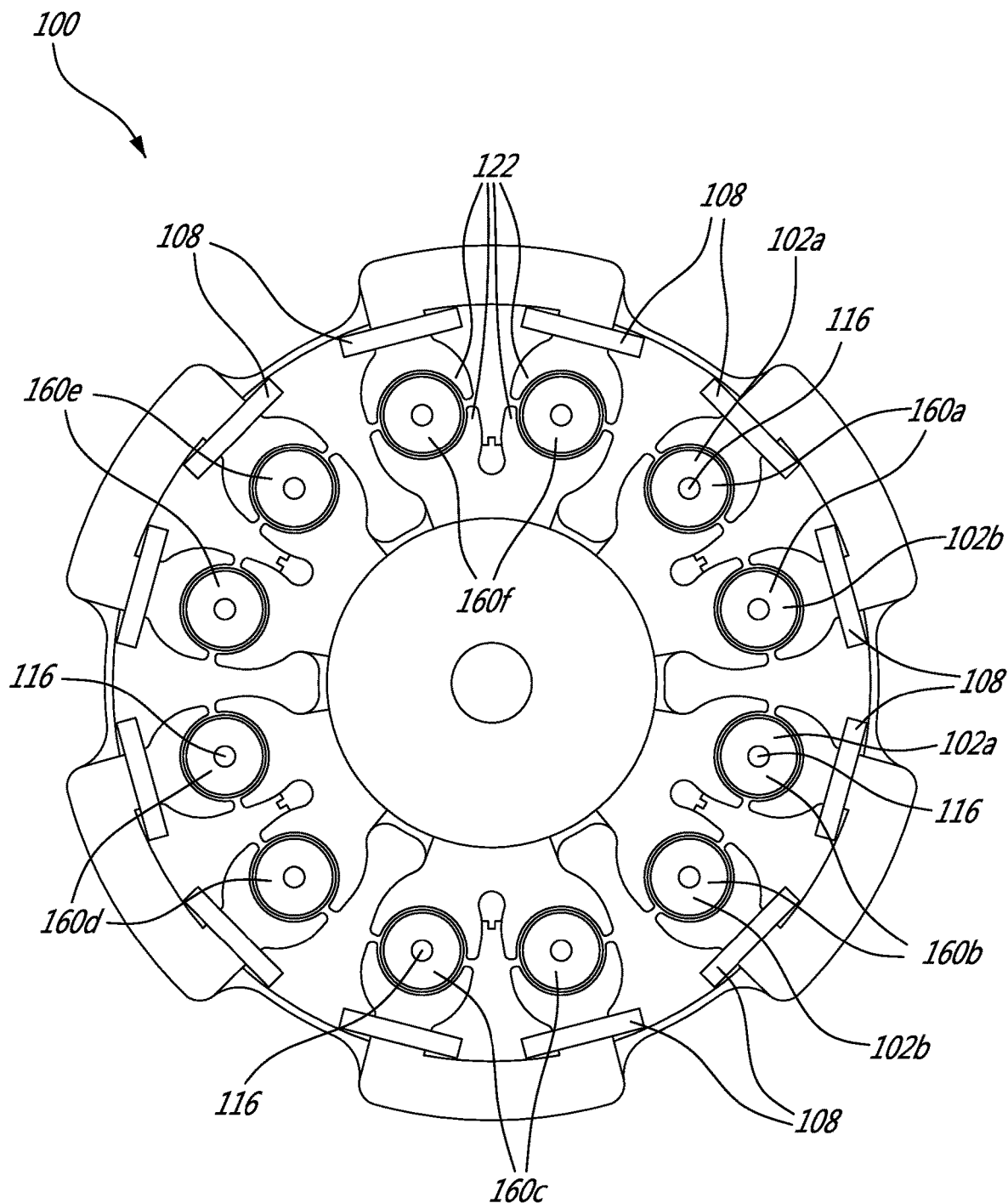
FIG. 2 is a schematic front cut-away view of portions of the electric machine of FIG. 1.
Figure 7:
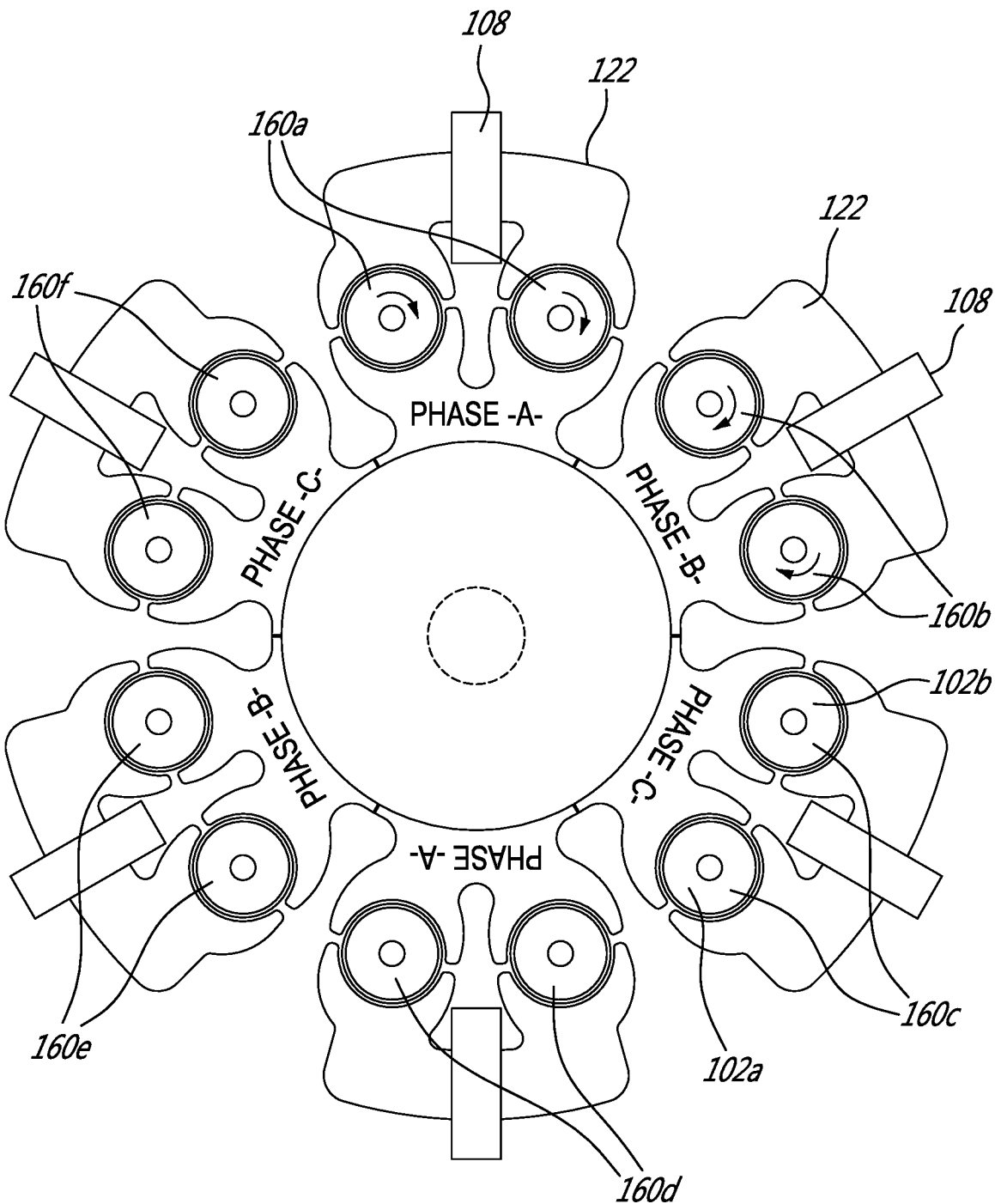
FIG. 7 is a simplified front cut-away view of portions of the machine depicted in FIG. 2.

FIG. 7 is a simplified front cut-away view of the machine 100 depicted in FIG. 2. As depicted, a common stator 122 is provided for each pair 160 of rotors 102a, 102b. Each stator 122 has a winding 108, although it will be appreciated that in some embodiments, a stator has more than one winding 108. In addition, windings for pairs 160a and 160d receive current from phase A, windings for pairs 160b and 160e receive current from phase B, and windings for pairs 160c and 160f receive current from phase C. It should be appreciated that any two stators can be connected by a single phase. In some embodiments, phase B is offset by 120 degrees from phase A, and phase C is offset by 240 degrees from phase A. The machine 100 may suffer from considerable losses during operation, and uses substantial quantities of iron, which implies greater weight and cost. Moreover, the configuration depicted in FIG. 7 may require a number of rotors which is divisible by 3. Since the rotors 102a, 102b are provided in pairs, this may limit the possible configurations to those which include 6 rotors, 12 rotors, 18 rotors, or the like.

It may be desirable to have greater flexibility in the number of rotors which can be included in a multi-rotor electric machine. Moreover, it may be desirable to reduce the quantity of iron required for stators and therefore the weight, cost, and losses associated with machine 100.

Figure 8:
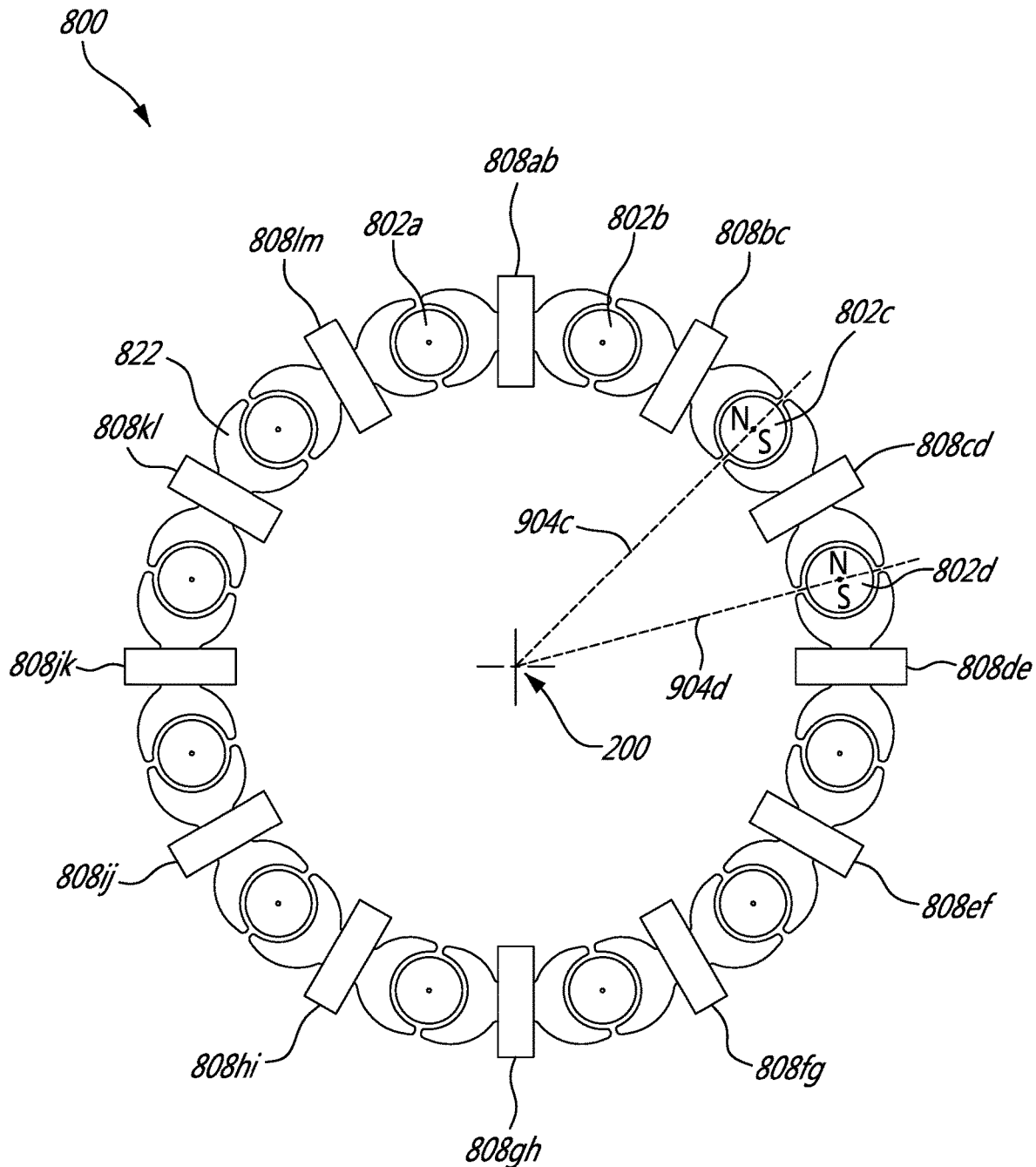
FIG. 8 is a simplified front cut-away view of an electric machine having multiple rotors.

FIG. 8 is a simplified front cut-away view of an electric machine system 800. As depicted, machine 800 includes a first multi-rotor machine 810 located in a first plane. Machine 810 includes one stator 822 and a plurality of windings 808 (depicted as winding 808ab for the winding appearing between rotors 802a and 802b, and so forth) and rotors 802a, 802b, 802c, 802d, . . . , 802n. It should be appreciated that machine 810 can have any number of rotors 802. That is, the number of rotors 802 need not be in multiples of 3, and the rotors need not be indexed in magnetically independent pairs as with machine 100, so there need not be an even number of rotors 802. In some embodiments, there is one common stator 822 for all rotors 802a, 802b, 802c, 802d, . . . , 802n in machine 810, and the electric power is supplied by a single phase (e.g. phase A). In some embodiments, the electric power is supplied in the form of AC electric power and the machine 810 operates as an asynchronous machine. In some embodiments, the electric power may be supplied as DC current, and machine 810 may operate as a DC motor.

In some embodiments, rotors 802a, 802b, 802c, 802d, . . . , 802n are disposed in a circular array arrangement circumferentially around axis 200 of central shaft 104. An index angle may be defined between equators (i.e. the line dividing north and south poles) for individual magnets for each rotor 802 and radii 904 extending from axis 200 to the corresponding rotor 802. For simplicity, only radii 904c, 904d are depicted for corresponding rotors 802c, 802d and index angles for other rotors 802 are omitted. As depicted, rotors 802c and 802d have index angles of 0 degrees, because the equator is parallel to radii 904c, 904d, respectively. By suitable positional phase offset of rotors 802 and/or rotor gears 818, index angles may be set at desired values for individual rotors, with the result that torque output applied by each rotor 802 can be enhanced.

The configuration of machine 810 in FIG. 8 may substantially reduce the amount of iron (e.g. for laminations) required, which may in turn reduce the weight, associated costs, and losses inside machine 810 during operation. In some embodiments, the configuration depicted in FIG. 8 may require 40% less iron to produce similar output power relative to machine 100. It will be appreciated that during operation, the output torque of each rotor 802 in machine 810 may exhibit a large degree of torque ripple, as each rotor 802a, 802b, . . . 802n varies between delivering no torque and the maximum output torque.

FIG. 9 is a side view of electric machine system 800 illustrating multiple machines 810, 810', 810" in parallel on different planes. As depicted, machine 800 includes first machine 810 in a first plane, second machine 810' in a second plane, and third machine 810" in a third plane. The machines 810, 810', 810" are positioned substantially perpendicularly to axis 200 of shaft 104. In some embodiments, machines 810, 810', 810" are substantially parallel to one another. In some embodiments, the circular array arrangement of rotors of machine 810 may be coaxial with the circular array arrangement of rotors of machine 810'. In some embodiments, the circular array arrangement of rotors of machine 810 may be axially offset from the second array arrangement of rotors of machine 810'.

Rotor shafts 816 (e.g. rotor shaft 816d) interconnect a respective rotor in machine 810 (e.g. rotor 802d) to a respective rotor in machine 810' (e.g. rotor 802d') and to a respective rotor in machine 810" (e.g. rotor 802d"). As depicted, respective gears 818 are connected or affixed to rotor shafts 816. As depicted, gear 818 is affixed or otherwise attached to rotor shaft 816 in a manner such that rotation of rotor shaft 816 causes gear 818 to rotate in the same direction and with a common rotational axis to shaft 816. In some embodiments, rotor shaft 816d is drivingly coupled to shaft 104 or a load via gear 818d. As referenced herein, the expression "drivingly coupled" encompasses an arrangement in which the rotation of one element results in the rotation or movement of another element (e.g., directly or indirectly). For example, although rotor shaft 816d does not directly touch shaft 104, the rotation of rotor shaft 816d causes gear 818d to rotate, which engages the central gear 120 and causes shaft 104 to rotate. For simplicity, FIG. 9 depicts gear 818c coupled to rotor shaft 816c and gear 818d coupled to rotor shaft 816d. Reference numerals for other gears and rotor shafts have been omitted for simplicity. As depicted, rotors shafts 816c, 816d may have parallel rotational axes. In some embodiments, an additional gear 818c' may be connected to rotor shaft 816c. The use of additional gear 818c' may further reduce the stress and strain experienced by gears during operation, as the stress and strain is distributed between two gears 818c, 818c' rather than concentrated on a single gear. Example embodiments which incorporate more than one gear are described in further detail below with reference to FIG. 12.

In some embodiments, the windings 808 of first machine 810 may be supplied with electric power from a first single phase (phase A). In some embodiments, the windings 108' of second machine 810' may be supplied with electric power from a second single phase (phase B). In some embodiments, the windings 108" of third machine 810" may be supplied with electric power from a third single phase (phase C). Phase B may be offset from phase A by 120 degrees. Phase C may be offset from phase A by 240 degrees. As noted above, each machine 810, 810', 810" includes a single common stator 822, 822', 822", respectively, and as such each machine 810, 810', 810" is powered by a unique phase.

The output torque from each rotor shaft (e.g. 816d) is equal to the sum of torques output by individual rotors (e.g. 802d, 802d', 802d"). If phase B is offset from phase A by 120 degrees, and phase C is offset from phase A by 240 degrees, the net output torque provided by rotor shaft 816d may have substantially less torque ripple relative to the output torque of any individual machine 810, 810' or 810". The output torque waveform may be similar in nature to that of FIG. 6 (although the quantitative torque output might not be similar between machines 400 and 800). For example, if the output torque of rotor 802d varies between 0 and the maximum output torque, then the sum of the output torque of rotor 802d with rotors 802d' and 802d" (which are offset by 120 degrees) would result in a far more stable output torque with less torque ripple than a single rotor.

Machine system 800 may also provide additional versatility and flexibility relative to other electric machines. For example, the same magnetic circuit can be used for both high-input speed generators, as well as low output speed propulsion motors by selecting the appropriate ratio between the gears 818 and the central gear 120. The speed selection may be carried out without the addition of a separate gearbox, which avoids the costs and weight associated with a gearbox as would be required by other electric machines.

Moreover, the machine 800 may allow for the use of the same bi-pole rotors 802 in machines of different sizes, because any suitable number of rotors 802 can be used to obtain the desired output torque. As such, cost savings may be achieved by using the same standardized rotors 802 across different applications, rather than having to tailor rotors 802 depending on the specific intended use of the machine 800. In addition, in machine 800, winding coils are exposed and the magnetic rotors 802 are distributed around the machine assembly, which may facilitate heat extraction from the machine 800 in a more convenient manner relative to machines where copper windings are contained within the stator iron. This may help to increase the power per weight and power per volume ratios of machine 800 relative to other electric machines.

Figure 10A:
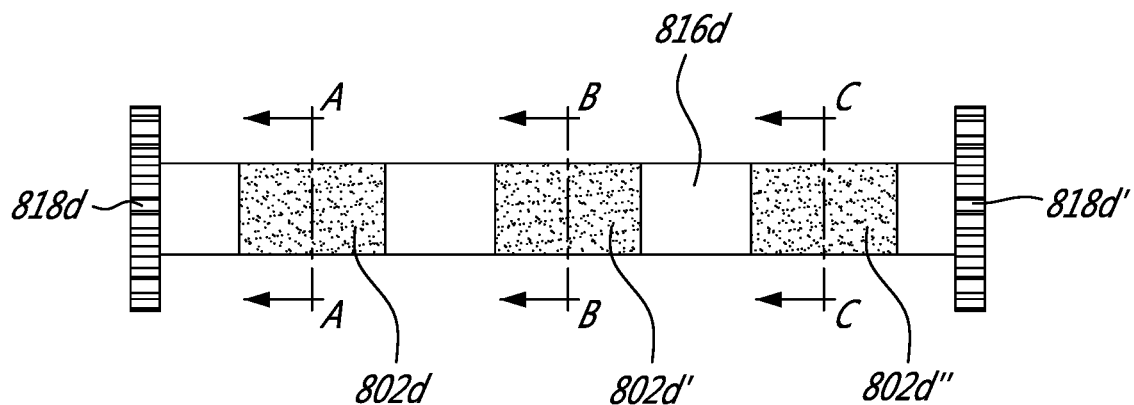
FIG. 10A is a simplified schematic side cross-sectional view of an individual rotor shaft of the machine system of FIG. 9.
Figure 10B:
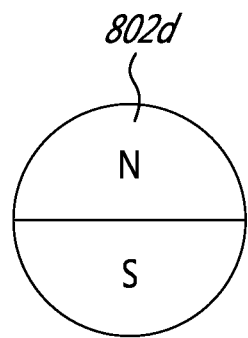
FIG. 10B is a view of a rotor on axis A-A in FIG. 10A.
Figure 10C:
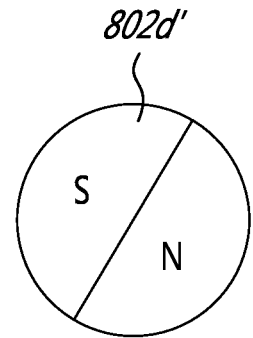
FIG. 10C is a view of a rotor on axis B-B in FIG. 10A.
Figure 10D:
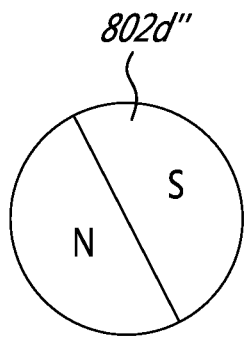
FIG. 10D is a view of a rotor on axis C-C in FIG. 10A.

FIG. 10A is a simplified schematic side cross-sectional view of an individual rotor shaft 816*d* of machine 800. As depicted, each rotor shaft 816 interconnects rotors 802*d*, 802*d'*, 802*d''* to gears 818*d*, 818*d'*. FIG. 10B is a view of rotor 802*d* on axis A-A in FIG. 10A. As depicted, rotor 802*d* includes a magnet with north and south poles and an equator. FIG. 10C is a view of rotor 802*d'* on axis B-B in FIG. 10A. As depicted, rotor 802*d'* includes a magnet with north and south poles, and is mechanically indexed by 120 degrees relative to rotor 802*d*. FIG. 10D is a view of rotor 802*d''* on axis C-C in FIG. 10A. As depicted, rotor 802*d''* includes a magnet with north and south poles, and is mechanically indexed by 240 degrees relative to rotor 802*d*, and by 120 degrees relative to rotor 802*d'*. It should be appreciated that although FIGS. 10A-10D illustrate a particular configuration of rotor indexing in machine 800, it is contemplated that other configurations may be used in order to enhance the operational characteristics of machine system 800.

In some embodiments, each rotor 802 in first machine 810 is connected to a respective rotor 802' in second machine 810' and a respective rotor 802" in third machine 810" via a rotor shaft 816. In some embodiments, there may be fewer rotor shafts 816 than there are rotors in machine 810.

Figure 11:
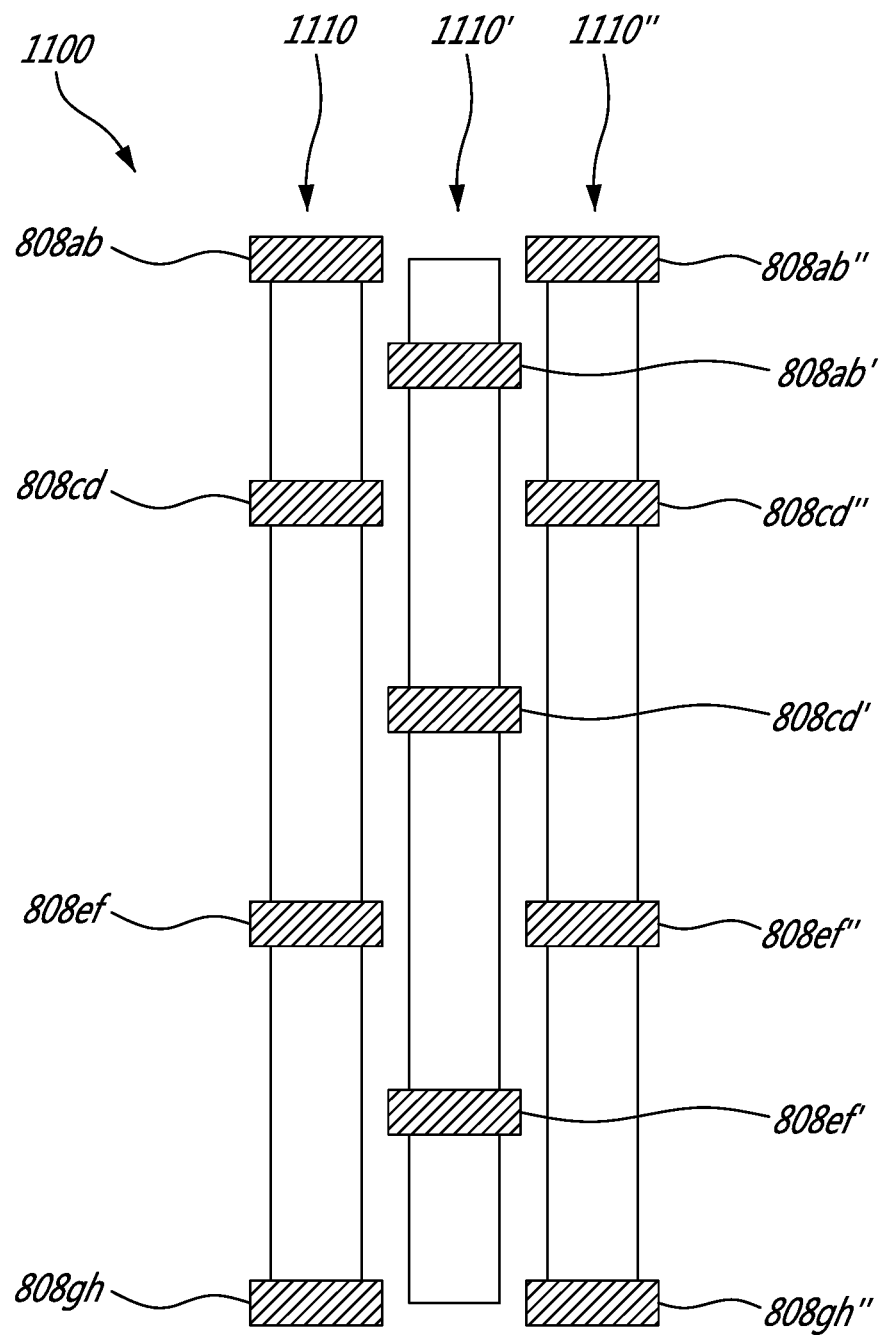
FIG. 11 depicts an alternative configuration of an electric machine system having multiple electric machines with multiple rotors in parallel.

FIG. 11 depicts an alternative configuration of an electric machine system 1100. Machine system 1100 is similar to machine system 800 in that each machine 1110, 1110', 1110" contains a plurality of rotors and a single stator and phase for each machine. Machine system 1100 differs in that one winding 1108 is provided between every pair of rotors. For example, referring to FIG. 8, winding 808*ab* may be provided between rotors 802*a* and 802*b*, and winding 808*cd* may be provided between rotors 802*c* and 802*d*. However, every second winding (e.g. windings 808*bc*, 808*de*, 808*fg*, 808*hi*, 808*jk*, 808*lm*) is omitted. Removing every second winding and rotating the middle machine 1110' may allow for the interlaced configuration depicted in FIG. 11.

As shown, the windings of each adjacent machine 1110, 1110', 1110" are offset in such a manner that windings of adjacent machines cannot touch. This may provide an added benefit of reducing the possibility of phase-to-phase short circuits, which may occur if windings from adjacent machines are too closely packed together. As an additional advantage, the configuration of FIG. 11 may save axial space, which may be advantageous in applications in which space is limited or at a premium.

It should be appreciated that although FIG. 9 depicts an embodiment of machine system 800 with machines 810 in 3 planes, it is contemplated that some embodiments may include fewer than 3 machines 810 in parallel, and some embodiments may include more than 3 machines 810 in parallel, connected via rotor shafts 816 to define common rotors between machines.

Figure 12:
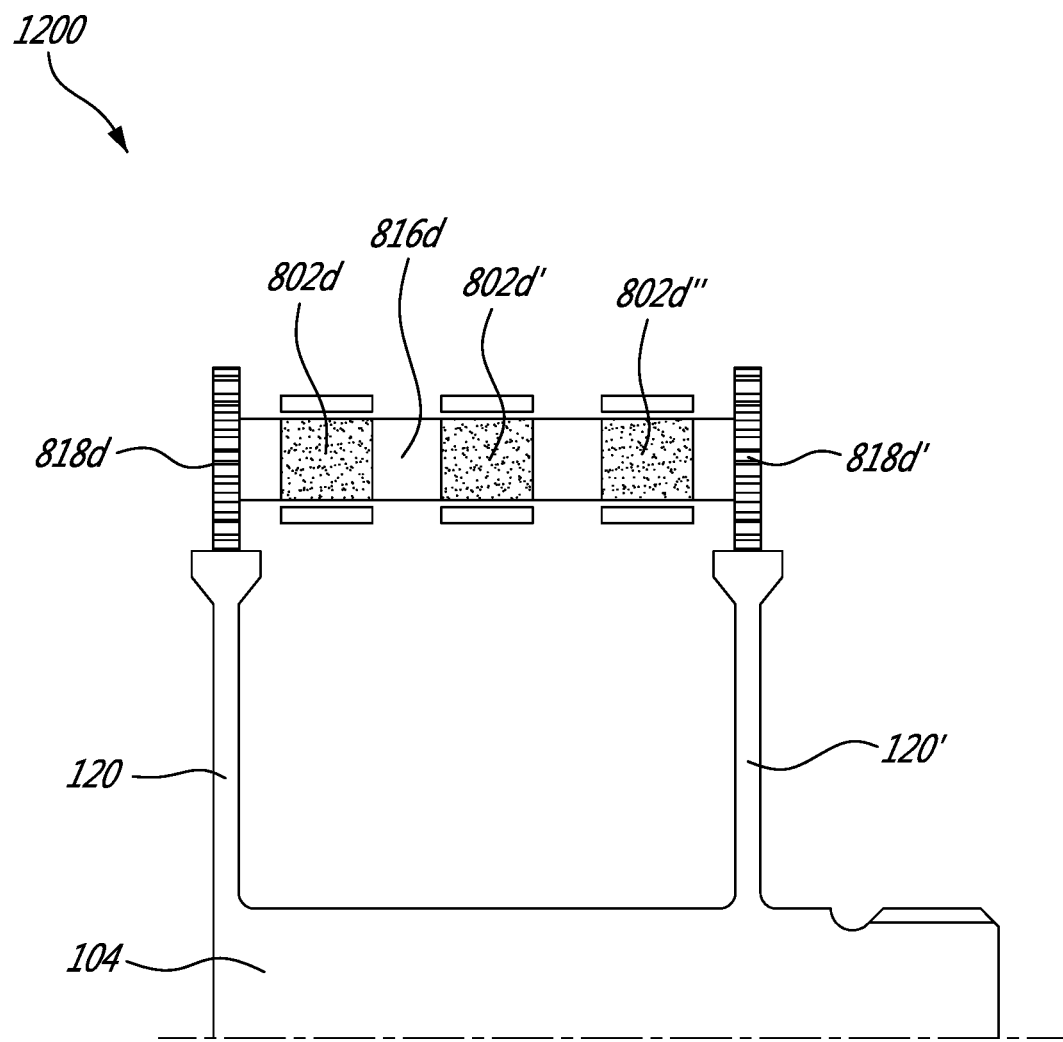
FIG. 12 is a partial cross-sectional view of an electric machine system having multiple electric machines with multiple rotors and multiple gears per rotor shaft.

As noted above, in some embodiments, machine systems 400, 800, 1100 may include more than one gear 418, 818 coupled to an individual rotor shaft 416, 816. FIG. 12 is a partial cross-sectional view of an electric machine system 1200 with multiple gears affixed or connected to each rotor shaft 816. It should be noted that although machine 1200 is described with reference to machine 800, the principles disclosed herein relating to machine 1200 with multiple gears per rotor shaft may be applied to numerous electric machine systems (and in particular to machine system 400 described herein).

As shown in FIG. 12, rotor shaft 816*d* interconnects each of rotors 802*d*, 802*d'*, 802*d''*. Gear 818*d* is connected to rotor shaft 816*d* adjacent to rotor 802*d*, and driving gear 818*d'* is connected to rotor shaft 816*d* adjacent to rotor 808*d''*. Each of gears 818*d*, 818*d'* is configured to engage with central gears. As depicted, driving gear 818*d* engages with a first central gear 120, and driving gear 818*d'* engages with a second central gear 120'. Each of central gears 120, 120' are rotatably fixed to shaft 104. As such, when rotor shaft 816*d* is caused to rotate by rotors 802*d*, 802*d'*, 802*d''*, both of gears 818*d* and 818*d'* are caused to drive central gears 120 and 120', respectively. Thus, the net torque applied to central shaft 104 is the sum of the torque applied by gears 818*d* and 818*d'*. It will be appreciated that relative to configurations with only one gear 818*d* per rotor shaft 816*d*, roughly the same net torque will be produced by the rotors 802*d*, 802*d'*, 802*d''*. As such, if gears 818*d*, 818*d'* have the same dimensions and central gears 120, 120' have the same dimensions, the torque exerted by each gear 818*d*, 818*d'* would be expected to be roughly half of the torque applied by gear 818*d* in an embodiment with one gear (minus any additional losses caused by the extra weight of the additional gear, and the like). Therefore, the addition of second gear 818*d'* may result in the strain and stress on each gear 818*d*, 818*d'* being significantly reduced, which may allow for the use of less expensive materials which are less resistant to stress (e.g. plastic), and may require less ongoing maintenance (e.g. less oil).

Although FIG. 12 depicts two gears 818*d*, 818*d'* per collective rotor, it should be appreciated that other embodiments which involve more than two gears (e.g. additional central gears and additional gears 818*d* which are located between any of rotors 802*d*, 802*d'*, 802*d''*) are contemplated, and may further reduce the stress and strain experience by gears.

It should be further noted that although FIG. 12 depicts an embodiment in which both central gears 120 and 120' are fixed to the same central shaft 104, it is contemplated that in other embodiments, central gear 120 may be fixed to a first input/output shaft 1304, and central gear 120' may be fixed to a second input/output shaft 1304' which may rotate independently from first input/output shaft 1304. As such, some embodiments of machine 1200 may be suitable for use in gearbox applications, without requiring the addition of a gearbox to machine 1200, which may provide numerous benefits relating to lower costs and reducing the weight and amounts of materials required for a given application.

Figure 13:
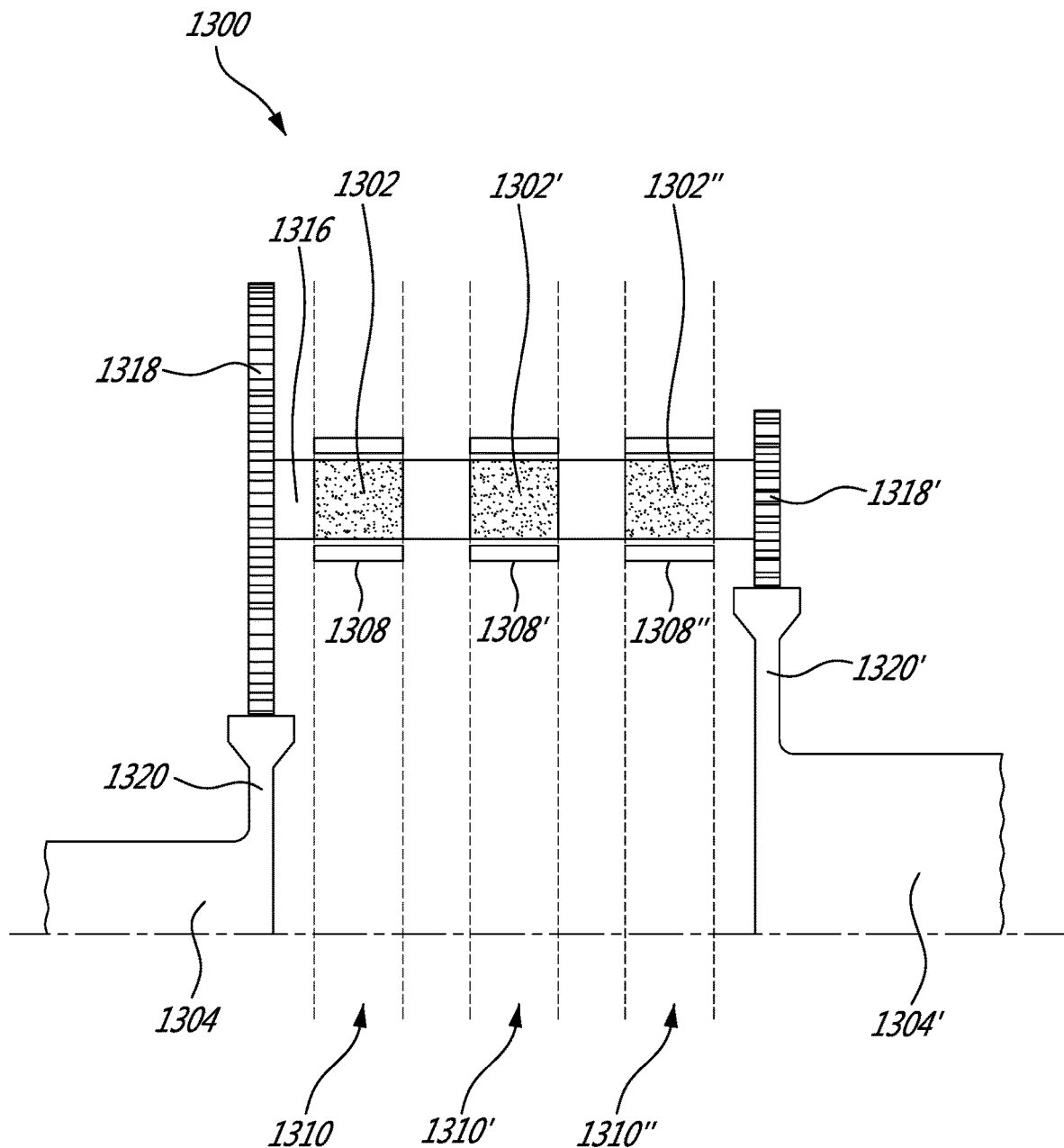
FIG. 13 is a schematic partial cross-sectional view of an electric machine system having independent input and output shafts.

FIG. 13 is a schematic partial cross-sectional view of an electric machine 1300 system having an independent input shaft 1304 and output shaft 1304'. Machine system 1300 is similar to machine system 1200 in many respects. Machine system 1300 includes one or more collective rotors 1350 (for simplicity, only one collective rotor 1350 is shown). Rotor shaft 1316 interconnects rotors 1302, 1302', 1302" of machines 1310, 1310', 1310" to define collective rotor 1350, and input gear 1318 is fixed to an end of collective rotor 1350 adjacent to first rotor 1302. Output gear 1318' is fixed to another end of collective rotor 1350 adjacent to third rotor 1302". In some embodiments, collective rotors 1350 have parallel rotational axes. In some embodiments, the collective rotors 1350 may be disposed to define a circular array arrangement. Although FIG. 13 depicts machine 1300 having 3 rotors per collective rotor, it will be appreciated that embodiments with as few as one electric machine rotor per collective rotor 1350 are contemplated. Embodiments with more than 3 electric machine rotors per collective rotor 1350 are also contemplated. In some embodiments, the electric machine rotors are axially spaced apart between the input gear 1318 and output gear 1318'.

As depicted, input gear 1318 is drivingly coupled to input shaft 1304 via first central gear 1320. First central gear may be fixed to input shaft 1304. Output gear 1318' is drivingly coupled to output shaft 1304' via second central gear 1320'. Second central gear 1320' is coupled to output shaft 1304'. In some embodiments, input shaft 1304 is connected to a gas turbine. In some embodiments, output shaft 1304' is connected to a propeller or fan. It will be appreciated that the speed at which input shaft rotates may be substantially different (faster or slower) from the speed at which output shaft rotates. Normally, a separate gearbox may be used to transfer mechanical energy from one rotating gear to another. However, in the embodiment shown in FIG. 13, no separate gearbox is required.

Instead, the sizes of first central gear 1320, input gear 1318, output gear 1318' and second central gear 1320' may be chosen such that the gear ratios allow for a rotation at the input shaft 1304 to result in a rotation in or around a desired speed at output shaft 1304'. Such rotation is achieved by the rotation of input shaft 1304 causing first central gear 1320 to rotate. The rotation of first central gear 1320 causes input gear 1318 to rotate at an angular speed. Output gear 1318' shares rotor shaft 1316 with input gear 1318, and so the output gear 1318' will also rotate at the same angular speed as input gear 1318. Output gear 1318' is coupled to second central gear 1320', and so the rotation of output gear 1318' causes the rotation of second central gear 1320', thereby causing the resulting rotation of output shaft 1304'.

In some embodiments, electrical rotors 1302, 1302', 1302" in machine system 1300 are operable in a generating mode and in a motoring mode. When electrical rotors 1302, 1302', 1302" are operating in a motoring mode, the rotor shafts 1316 may be indexed to provide a torque phase offset relative to each other. When electrically powered, the mechanical power at the input shaft 1304 is transmitted through machine 1300 in a manner similar to that of a gearbox. When electrical rotors 1302, 1302', 1302" are electrically powered, the power output to output shaft 1304' is the sum of the mechanical power at input shaft 1304 and the output power of machines 1310, 1310', 1310". As such, in situations where the mechanical input power at shaft 1304 is insufficient to achieve the desired output at output shaft 1304', machines 1310, 1310', 1310" may be electrically powered so as to provide additional output power to output shaft 1304'.

In addition, the machine system 1300 can act as an in-line generator to convert some of the mechanical input power at shaft 1304 to electrical current at windings 1308, 1308', 1308". This electrical power may be used for various purposes, such as, for example, aircraft electrical systems, charging batteries, or the like. In some embodiments (e.g. turbine engines), the generated electrical power may be used to accelerate or apply positive torque to the high pressure spool or compressor spool of an engine core.

Contrary to conventional hybrid electrical applications, the assistance provided by machine 1300 is not applied on a high-speed output shaft or to an auxiliary pad of a reduction gearbox. Instead, machine 1300 may act as a gearbox with an electric machine embedded therein.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A power transmission system comprising:
an input shaft;
an output shaft;
one or more first electric machine rotors disposed on a first rotatable shaft, said first rotatable shaft structurally separate from said input shaft and said output shaft;
a first gear directly connected to the first rotatable shaft and connected to the input shaft; and
a second gear directly connected to the first rotatable shaft and connected to the output shaft, the one or more first electric machine rotors being disposed between the first gear and the second gear, said first and second gears configured to rotate at a same rotational speed and in a same rotational direction as said first rotatable shaft;
a second electric machine rotor disposed on a second rotatable shaft structurally separate from said first rotatable shaft, said input shaft and said output shaft;
a third gear directly connected to the second rotatable shaft and coupled to the input shaft; and
a fourth gear directly connected to the second rotatable shaft and coupled to the output shaft, said third and fourth gears configured to rotate at a same rotational speed and a same rotational direction as said second rotatable shaft, the first and second rotatable shafts having parallel rotation axes.

2. The system of claim 1, wherein a radius or number of teeth of the first gear is different from a radius or number of teeth of the second gear.

3. The system of claim 1, wherein the one or more first electric machine rotors comprise two first electric machine rotors disposed on said first rotatable shaft and connected to the first and second gears.

4. The system of claim 3, wherein the one or more first electric machine rotors comprise three electric machine rotors disposed on said first rotatable shaft and connected to the first and second gears.

5. The system of claim 3, wherein the two first electric machine rotors are indexed to have a positional phase offset relative to each other.

6. The system of claim 3, wherein the two first electric machine rotors are indexed to provide a torque phase offset relative to each other when operating in a motoring mode.

7. The system of claim 3, wherein the two first electric machine rotors are operable in a generating mode and in a motoring mode.

8. The system of claim 1, wherein the first and third gears are disposed circumferentially about the input shaft.

\* \* \* \* \*